United States Patent
Rabinowitz

(10) Patent No.: US 6,964,486 B2
(45) Date of Patent: Nov. 15, 2005

(54) ALIGNMENT OF SOLAR CONCENTRATOR MICRO-MIRRORS

(76) Inventor: Mario Rabinowitz, 715 Lakernead Way, Redwood City, CA (US) 94062

( * ) Notice: Subject to any disclaimer, the term of this patent is extended or adjusted under 35 U.S.C. 154(b) by 114 days.

(21) Appl. No.: 10/762,813

(22) Filed: Jan. 22, 2004

(65) Prior Publication Data

US 2005/0162763 A1    Jul. 28, 2005

(51) Int. Cl.[7] .............................................. G02B 7/182
(52) U.S. Cl. ...................... 359/851; 359/853; 359/873; 359/872
(58) Field of Search .............................. 359/851, 853, 359/872, 873, 296, 290, 220, 221, 223, 224, 359/225, 226; 126/600, 684

(56) References Cited

U.S. PATENT DOCUMENTS

| | | | |
|---|---|---|---|
| 3,670,323 A | 6/1972 | Sobel et al. ............. 340/324 R |
| 4,261,653 A | 4/1981 | Goodrich .................... 359/296 |
| 5,717,515 A | 2/1998 | Sheridon .................... 359/296 |
| 5,754,332 A | 5/1998 | Crowley ..................... 359/296 |
| 5,808,783 A | 9/1998 | Crowley ..................... 359/296 |
| 5,815,306 A | 9/1998 | Sheridon et al. ............. 359/296 |
| 5,914,805 A | 6/1999 | Crowley ..................... 359/296 |
| 6,197,228 B1 | 3/2001 | Sheridon .................... 264/136 |
| 6,211,998 B1 | 4/2001 | Sheridon .................... 359/296 |
| 6,222,513 B1 | 4/2001 | Howard et al. ............... 345/84 |
| 6,243,058 B1 | 6/2001 | Mikkelsen et al. ............ 345/84 |
| 6,249,271 B1 | 6/2001 | Albert et al. ............... 345/107 |
| 6,262,707 B1 | 7/2001 | Sheridon .................... 345/111 |
| 6,335,818 B1 | 1/2002 | Torres ....................... 359/296 |
| 6,570,700 B2 | 5/2003 | Engler et al. ............... 359/296 |
| 6,612,705 B1 * | 9/2003 | Davidson et al. ............ 359/851 |
| 6,738,176 B2 * | 5/2004 | Rabinowitz et al. ......... 359/296 |
| 2002/0131151 A1 | 9/2002 | Engler et al. ............... 359/296 |
| 2003/0192998 A1 | 10/2003 | Davidson et al. ............ 359/850 |
| 2003/0193726 A1 | 10/2003 | Davidson et al. ............ 244/172 |
| 2003/0202235 A1 | 10/2003 | Rabinowitz et al. ......... 359/296 |
| 2003/0202265 A1 * | 10/2003 | Reboa et al. ................ 359/877 |

* cited by examiner

Primary Examiner—Hung Xuan Dang
Assistant Examiner—Tuyen Tra

(57) ABSTRACT

Due to an ever growing shortage of conventional energy sources, there is an increasingly intense interest in harnessing solar energy. The instant invention is concerned with method and apparatus for the alignment of solar concentrator micro-mirrors and the maximization of the percentage of incident light that is reflected to the receiver. Novel method and apparatus are taught for operating the addressing and alignment micro-optics solar concentrator system for single-axis and two-axis tracking. Broadly this invention deals with novel concepts used for alignment in the focussing of light wherever mirrors are used for focussing such as for solar propulsion assist, illumination and projection of light, optical switching, etc. A particularly important objective is the focussing of sunlight for solar power conversion and production. The instant invention can contribute to the goal of achieving environmentally clean solar energy on a large enough scale to be competitive with conventional energy sources.

20 Claims, 2 Drawing Sheets

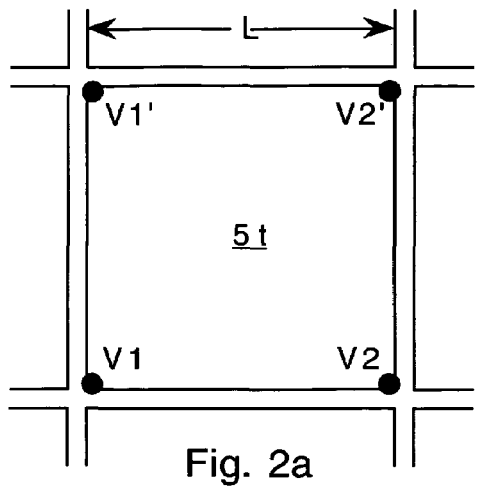
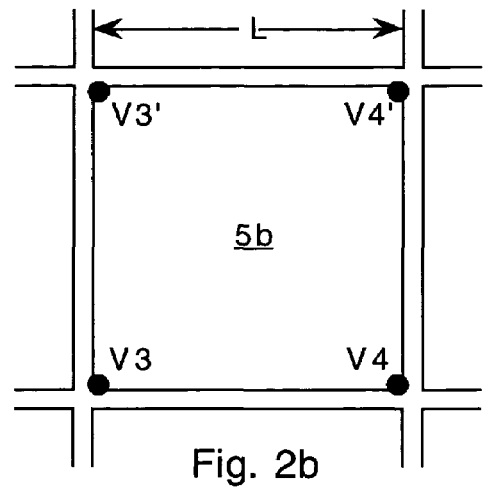
Fig. 2a                Fig. 2b
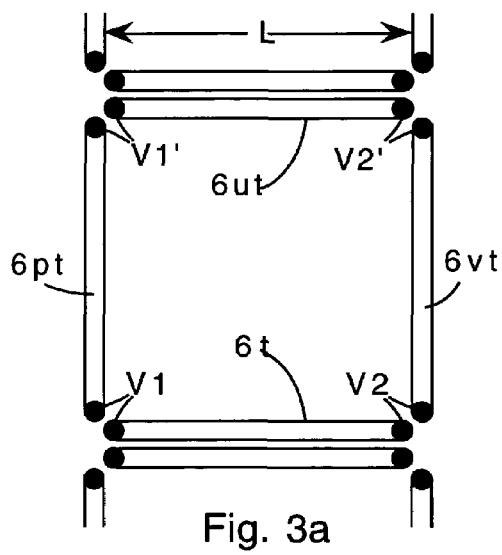
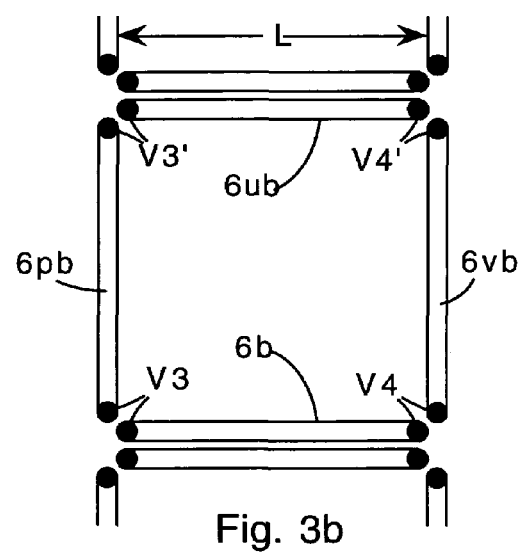
Fig. 3a                Fig. 3b
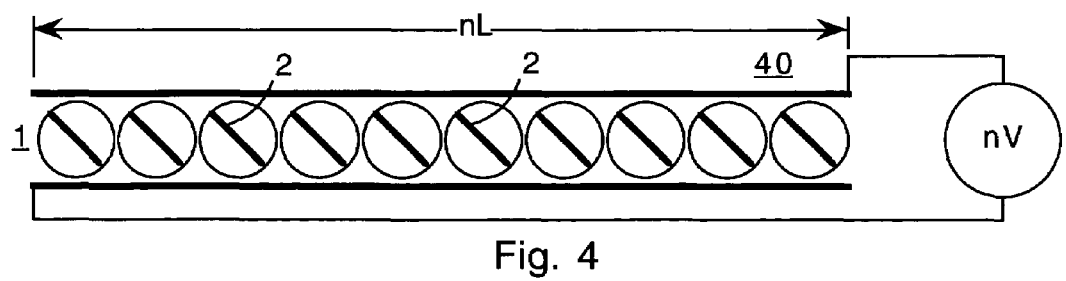
Fig. 4

ALIGNMENT OF SOLAR CONCENTRATOR MICRO-MIRRORS

INCORPORATION BY REFERENCE

The following U.S. patents, allowed patent applications, and pending patent applications are fully incorporated herein by reference:

U.S. Pat. No. 6,612,705 by Mark Davidson and Mario Rabinowitz, "Mini- Optics

Solar Energy Concentrator" issued on Sep. 2, 2003.

U.S. Publication #2003-0202235-A1 by Mario Rabinowitz and Mark Davidson,

"Dynamic Multi-Wavelength Switching Ensemble" allowed on Oct. 6, 2003. U.S. Publication #2003-0192998 by Mark Davidson and Mario Rabinowitz, "Solar Propulsion Assist" allowed on Nov. 4, 2003.

U.S. Publication #2003-0193726-A1 by Mark Davidson and Mario Rabinowitz, "Active Reflection Illumination and Projection" is pending.

BACKGROUND OF THE INVENTION

This invention provides a low cost means for achieving affordable solar energy by greatly reducing the cost of solar concentrators which increase (concentrate) the density of solar energy incident on the solar energy converter. A limiting factor in the utilization of solar energy is the high cost of energy converters such as photovoltaic cells. For example, for the purpose of generating electricity, a large area of expensive solar cells may be replaced by a small area of high-grade photovoltaic solar cells operating in conjunction with inexpensive intelligent micro-optics of this invention. Thus the instant invention can contribute to the goal of achieving environmentally clean energy on a large enough scale to be competitive with conventional energy sources.

The rotatable elements of this inventions are balls and cylinders. As derived in U.S. Pat. No. 6,612,705 of which the inventor of this instant invention is the co-inventor, balls in a square array have a packing fraction of 0.785 and 0.907 in an hexagonal array. Balls have an advantage over cylinders in that they can operate in either a single-axis or two-axis tracking mode. Cylinders have an advantage over balls in that they can have a packing fraction of nearly 1, but they are limited to a single-axis tracking mode.

The presence of rotatable mirrors in a solar concentrator presents either a dilemma or an opportunity with respect to the basic nature of the alignment implementation. Mirrors are normally made of a conductive metallic coating. In an applied electrostatic field, E, a dipole moment is induced in the metallic conducting material of the micro-mirrors because the charge distributes itself so as to produce a field free region inside the conductor. To internally cancel the applied field E, free electrons move to the end of each conducting mirror antiparallel to the direction of E, leaving positive charge at the end that is parallel to the direction of E. Another way to think of this in equilibrium is that a good conductor cannot long support a voltage difference across it without a current source. An induced electrostatic dipole in a conductor in an electrostatic field is somewhat analogous to an induced magnetic dipole in a pivoted ferromagnetic material in a magnetic field, which effect most people have experienced. When pivoted, a high aspect ratio (length to diameter ratio) ferromagnetic material rotates to align itself parallel to an external magnetic field.

If alignment is attempted in a conventional manner such as is used in Gyricon displays, the induced polarization electric dipole field presents a dilemma since it is perpendicular to the zeta potential produced dipole field and the net vector is in neither direction. The "zeta potential," is the net surface and volume charge that lies within the shear slipping surface resulting from the motion of a body through a liquid. The zeta potential is an electrical potential that exists across the interface of all solids and liquids. It is also known as the electrokinetic potential. The zeta potential produces an electric dipole field when a sphere it is made from two dielectrically different hemispheres due to their interaction with the fluid surrounding it.

One way to eliminate or greatly diminish the effect of the zeta potential is to make the surface of both hemispheres out of the same material. This would be quite difficult for Gyricon displays because they require optically different surfaces e.g. black and white, or e.g. cyan, magenta, and yellow for color mixing. In the instant invention, no problem arises by making both hemispheres out of the same transparent material to eliminate or minimize the zeta potential. In fact this presents an opportunity to both utilize the induced polarization electric dipole field and to have two mirror surfaces. With two mirror surfaces, an option presents itself to use the better surface as the surface that reflects the light, and furthermore to have a standby mirror in each element should one of the mirrors degrade. A permanent electret dipole can be sandwiched between the two induced dipole mirrors to further enhance the dipole field that interacts with the addressable alignment fields.

The topic of the dipole interactions between balls seems not to have been discussed in the Gyricon patents and literature. A heuristic analysis shows that this is not a serious problem. The electric field strength of a dipole, $E_d$ is proportional to $1/r^3$, where r is the radial distance from the center of the dipole. The energy in the field is proportianal to $(E_d)^2$. Thus the energy of a dipole field varies as $1/r^6$. The force is proportional to the gradient of the field, and hence varies as $1/r^7$. With such a rapid fall off of the dipole interaction force, it can generally be made very small compared to the force due to the applied field E, and to the frictional forces that are normally present. Therefore interaction of the dipole field forces between mirrored elements (balls or cylinders) can generally be made negligible.

The 1998 Gyricon U.S. Pat. No. 5,717,515 of Sheridon, entitled "Canted Electric Fields for Addressing a Twisting Ball Display" is exclusively concerned with Displays. There appears to be no mention of any other application than directly viewed Displays, either specifically or by general statement. In this Sheridon patent, no mention is made of a mirror in the gyricon balls, nor is there any mention of specular reflection as would be obtained from a mirror. On the contrary, means are discussed to increase diffuse reflection from the balls so the Gyricon display may easily be observed from all angles. Certainly there is no anticipation of a solar concentrator application, mirrored illumination and projection, solar propulsion assist, or any other micro-mirror application. Furthermore there is no mention of coupling means to the balls other than by means of the zeta potential dipole, or an electret dipole both of which are parallel to the Gyricon axis of symmetry which in the case of black and white balls goes through the vertex of the black hemisphere, the center of the sphere, and the vertex of the white hemisphere. Also there is no mention of an induced polarization electric dipole in the balls. In their dielectric balls there is an inadvertent insignificant induced polarization electric dipole in the dielectric, but it is small compared with the induced polarization electric dipole of the instant invention. Furthermore, it is parallel to the Gyricon axis of symmetry, whereas in the instant invention the induced polarization electric dipole is perpendicular to the axis of symmetry. Thus the application of the same electric field in the instant invention produces an entirely different orientation or alignment than in the Sheridon patent.

This Sheridon patent focuses on emodiments of "segmented electrodes" for Displays only, without mention of other applications, or that their invention may be applied more broadly. Yet, interestingly, some of the claims are quite general. Since claims should be a summary of the invention described in the specification, it appears that such broad claims are not warranted by the specification. Nor do such broad claims seem warranted in view of the prior 1981 Goodrich U.S. Pat. No. 4,261,653, which is also quite specific, and differs considerably from the instant invention.

The instant invention differs substantially from that of Sheridon and from that of Goodrich in the use of: mirrored balls and cylinders; induced polarization electric dipoles in the mirrors with or without permanent dipoles in electrets; the dipole fields being perpendicular to the axis of symmetry (rather than parallel); the use of fragmented wire electrodes to provide greater transparency; and the combination of fragmented wire electrodes and partitoned electrodes to provide greater transparency of the active surface than in the Sheriron patent.

The instant invention is primarily concerned with method and apparatus for the alignment of solar concentrator micro-mirrors. However, it has broader applications wherever mirrors are used for focussing such as for solar propulsion assist, illumination and projection of light, optical switching, etc.

Definitions

"Bipolar" refers herein to either a magnetic assemblage with the two poles north and south, or an electric system with + and − charges separated as in an electret.

"Concentrator" as used herein in general is a micro-mirror system for focussing and reflecting light. In a sollar energy context, it is that part of a solar Collector system that directs and concentrates solar radiation onto a solar Receiver.

"Concentration factor" is < or ~ of the ratio of the area of the concentrator to that of the area of the receiver. It is the factor such as 10×, 100×, etc. by which the solar flux is concentrated at the receiver relative to the ordinary solar flux.

"Dielectric" refers to an insulating material in which an electric field can be sustained with a minimum power dissipation. [Most transparent materials are dielectrics. However Indium/Tin Oxide (also called ITO in the literature) is a conductor that is also transparent.]

"Elastomer" is a material such as synthetic rubber or plastic, which at ordinary temperatures can be stretched substantially under low stress, and upon immediate release of the stress, will return with force to approximately its original length.

"Electret" refers to a solid dielectric possessing persistent electric polarization, by virtue of a long time constant for decay of charge separation.

"Focussing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"Packing fraction" herein refers to the fraction of an available area occupied by the collection (ensemble) of rotatable elements.

"Receiver" as used herein in general is a system for receiving reflected light. In a sollar energy context, it receives concentrated solar radiation from the micro-mirror assembly for the conversion of solar energy into more conveniently usable energy such as electricity.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

"Zeta potential," is the net surface and volume charge that lies within the shear slipping surface resulting from the motion of a body through a liquid. It is an electrical potential that exists across the interface of all solids and liquids. It is also known as the electrokinetic potential. The zeta potential produces an electric dipole moment (field) of a spherical body when it is made from two dielectrically different hemispheres due to the interaction of the sphere with the fluid that it is immersed in.

SUMMARY OF THE INVENTION

There are many objects, aspects, and applications of this invention. Broadly this invention deals with the general concept of method and apparatus for focussing light by using mirrors. A particularly important object is the alignment of micro-mirrors for the focussing of sunlight in power conversion and production. Accordingly, other aspects and advantages are given below.

A particularly important aspect is to provide a unique tracking and focussing system for solar power conversion.

Another aspect is to provide the options of single-axis tracking or two- axis tracking by the concentrator micro-mirrors for different applications.

Another aspect is to provide a rugged system for conversion of solar energy to heat.

Another aspect is to provide electricity for both mobile and stationary communications systems.

Another aspect is to provide large-scale environmentally clean energy.

Another aspect is to help in the industrialization of developing countries.

Another aspect is to provide a low-cost, tough, light-weight, concentrated efficient solar energy converter that is highly portable.

Another aspect is to provide a minitiarized quasi-planar heliostat field configuration that can track the sun.

Another aspect is to provide a portable system that can easily go anywhere man can go, to track and concentrate the sun's energy.

Other aspects, objects and advantages of the invention will be apparent in a description of specific embodiments thereof, given by way of example only, to enable one skilled in the art to readily practice the invention as described hereinafter with reference to the accompanying drawings. In accordance with the illustrated preferred embodiments, method and apparatus are presented that are capable of producing alignment and mirror reflection of a source of light such as sunlight.

BRIEF DESCRIPTION OF THE DRAWINGS

FIG. 2a represents a top view of an array of partitioned highly resistive electrodes showing in detail a top view of one such electrode and the voltages at its four corners.

FIG. 2b represents a bottom view of an array of partitioned highly resistive electrodes showing in detail a view of a bottom electrode and the voltages at its four corners.

FIG. 3a represents a top view of an array of fragmented highly resistive wire electrodes showing in detail a top view of a set of four such adjacent electrodes and the voltages at their ends.

FIG. 3b represents a bottom view of an array of fragmented highly resistive wire electrodes showing in detail a bottom view of a set of four such adjacent electrodes and the voltages at their ends.

FIG. 4 is a cross-sectional view of an ensemble of n micro-mirrored elements beween the electrodes of one grid element n times longer than in the previous FIGS. 1, 2, and 3.

DETAILED DESCRIPTION OF THE PRESENTLY PREFERRED EMBODIMENTS

Figure 1A:
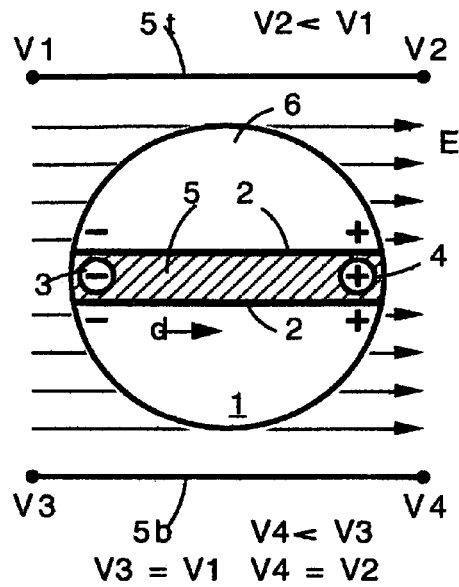
FIG. 1a is a cross-sectional view of a rotatable element with an electret dipole sandwiched between induced dipole micro-mirrors aligned parallel to partitioned electrodes where an ensemble of such elements are a major constituent of a micro-optics concentrator.

FIG. 1a is a cross-sectional view of a rotatable element 1 with an electret dipole 5 sandwiched between micro-mirrors 2 aligned parallel to top partitioned highly resistive electrode 5t and bottom partitioned highly resistive electrode 5b, where an ensemble of such elements and electrodes are a major constituent of a micro-optics concentrator. The inventor of this instant invention is the co-inventor of U.S. Pat. No. 6,612,705, in which the micro-optics concentrator is described in detail. The micro-mirrors 2 are shiny circular flat conducting metal close to the equatorial plane of the elements 1. The partitioned electrodes and other types of electrodes are discussed in conjunction with FIGS. 2a, 2b, 3a, and 3b. A micro-processor sends signals via bus bars to establish voltages from a power supply to each partitioned electrode which is made of a highly resistive thin transparent conductor such as an alloy of indium tin oxide (ITO). For top partitioned electrode 5t, the left corner is at voltage V1 and the right corner is at voltage V2. For bottom partitioned electrode 5b, the left corner is at voltage V3 and the right corner is at voltage V4. A signal sets the voltages so that $V3=V1$, $V4=V2$, $V2<V1$, and $V4<V3$, to produce an approximately uniform applied electric field E parallel to the electrodes 5t and 5b as shown.

The applied electric field E induces a dipole moment in the metallic conducting material of the micro-mirrors 2. This is because when a metallic conductor is placed in an electric field, the charge distributes itself so as to produce a field free region inside the conductor. To internally cancel the applied field E, negative − free electrons move to the end of each conducting micro-mirror 2 opposite to the direction of E, leaving positive + charge at the end in the direction of E. The torque interaction of the induced electric dipole moment of the micro-mirrors 2 and the electric field E acts to align the micro- mirrors 2 parallel to the electric field E as shown here in FIG. 1. The torque is proportional to the product of E and the dipole moment.

An electret 5 is used to augment the torque. In equilibrium i.e. when the rotation is complete, the polarization due to the electret 5 and that due to the induced charges of the conducting micro-mirrors 2 add together to produce a total dipole moment d parallel to the micro-mirrors 2, and parallel to the applied electric field E. The positive + end 4 and the negative − end 3 of the electret 5 align themselves parallel to the electric field E due to the torque interaction of the permanent electric dipole moment of the electret 5 and the applied electric field E, which is proportional to their product. Since the electret 5 and its dipole moment are parallel to the micro-mirrors 2, this torque interaction aligns the micro-mirrors 2 parallel to the applied electric field E.

The presence of the electret 5, enhances the torque. In the absence of the electret 5, the dipole moment induced in the micro-mirrors 2 can be sufficient to produce alignment. However, the additional torque provide by the electret 5 helps to overcome frictional effects. In this embodiment, the hemispheres 6 are made of the same transparent material which minimizes the effect of the zeta potential which has been previously discussed.

In operating by means of an induced polarization dipole field, the instant invention operates by a substantially different mechanism than in Gyricon displays. The instant invention also differs substantially from Gyricon displays in terms of the axis of symmetry of the elements 1, i.e. the balls or cylinders. In Gyricon displays, the axis of symmetry of their balls and cylinders is parallel to the applied electric field since the zeta potential dipole is parallel to the applied electric field. In the instant invention, the axis of symmetry of the elements 1 is perpendicular to the applied electric field because the micro-mirrors 2 and hence the induced polarization dipole field is perpendicular to the axis of symmetry. It should be noted that here in FIG. 1, the electric field E orientation here is at right angles to that which is used in Gyricon displays. Here E is parallel to the equatorial plane of the balls and the top surface 5t which admits light. In Gyricon displays, E is perpendicular to the Gyricon ball equatorial plane and to the top surface—the viewing surface which admits light.

Figure 1B:
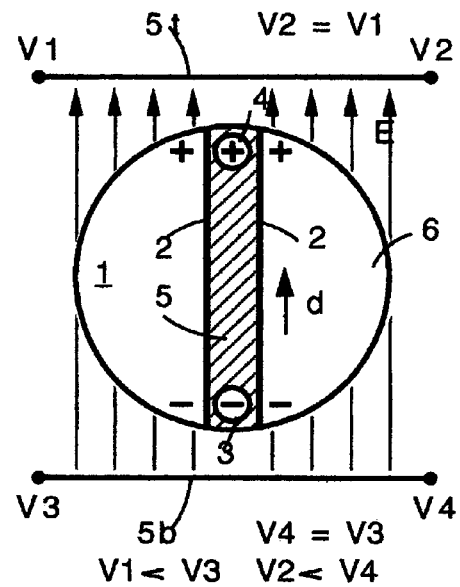
FIG. 1b is a cross-sectional view of a rotatable element with an electret dipole sandwiched between induced dipole micro-mirrors aligned perpendicular to partitioned electrodes where an ensemble of such elements are a major constituent of a micro-optics concentrator.

FIG. 1b is a cross-sectional view of a rotatable element 1 with an electret dipole 3 sandwiched between induced dipole micro-mirrors 2 aligned perpendicular to top partitioned highly resistive electrode 5t and bottom partitioned highly resistive electrode 5b, where an ensemble of such elements and electrodes are a major constituent of a micro-optics concentrator. For top partitioned electrode 5t, the left corner is at voltage V1 and the right corner is at voltage V2. For bottom partitioned electrode 5b, the left corner is at voltage V3 and the right corner is at voltage V4. A signal sets the voltages so that $V2=V1$, $V4=V3$, $V1<V3$, and $V2<V4$, an approximately uniform applied electric field E is produced perpendicular to the electrodes 5t and 5b as shown. The micro-mirrors 2 align themselves parallel to the applied electric field E due to the induced dipole field polarization of the mirrors, and permanent dipole of the electret 5.

Figure 1C:
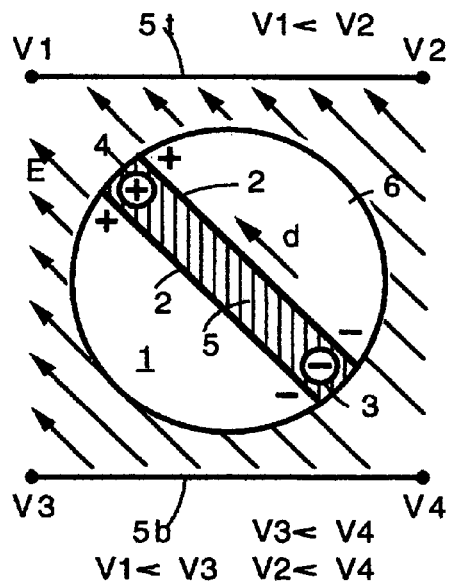
FIG. 1c is a cross-sectional view of a rotatable element with an electret dipole sandwiched between induced dipole micro-mirrors aligned at a tilted angle with respect to partitioned electrodes where an ensemble of such elements are a major constituent of a micro-optics concentrator.

FIG. 1c is a cross-sectional view of a rotatable element 1 with an electret dipole 5 sandwiched between induced dipole micro-mirrors 2 aligned at a tilted angle with respect to top partitioned highly resistive electrode 5t and bottom partitioned highly resistive electrode 5b, where an ensemble of such elements and electrodes are a major constituent of a micro-optics concentrator. For top partitioned electrode 5t, the left corner is at voltage V1 and the right corner is at voltage V2. For bottom partitioned electrode 5b, the left corner is at voltage V3 and the right corner is at voltage V4. A signal sets the voltages so that V1<V2, V3<V4, V1<V3, and V2<V4, an approximately uniform applied electric field E is produced that is tilted with respect to to the electrodes 5t and 5b as shown. The micro-mirrors 2 align themselves parallel to the electric field E due to the induced dipole field polarization of the mirrors, and permanent dipole of the electret 5. For balls, two-axis tracking is possible by additional alignment of the micro-mirrors 2 out of the plane of the paper. This is accomplished by similar voltage relationships to those already described as can be understood from the top and bottom electrode views shown in FIGS. 2 and 3. Cylinders would be restricted to single-axis tracking. The chosen alignment angle i.e. tilt angle of the rotatable elements 1 can be held in place by the containment sheets upon which the electrodes 5t and 5b are located. Thus during the interval between alignments, the alignment voltages may be switched off to conserve power. As described in U.S. Pat. No. 6,612,705 (of which the present inventor is a co-inventor), a plenum can be used to slightly force the containment sheets apart. as well as other means when a new alignment is desired.

Figure 1D:
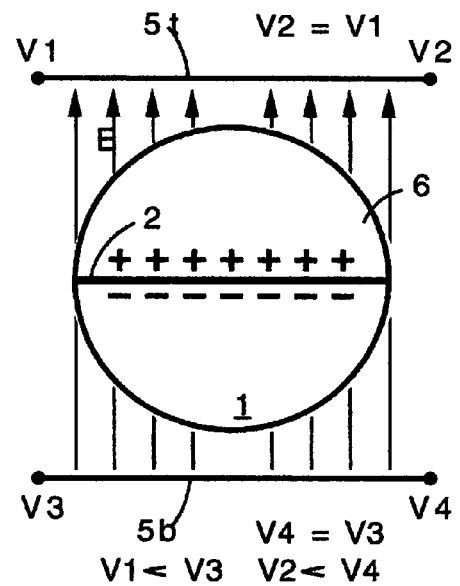
FIG. 1d is a cross-sectional view of a rotatable element that does not use an electret, showing an induced dipole micro-mirror in its only unstable positon of being perpendicular to the applied field. From this unstable position it will rotate to an alignment in which the plance of the mirror is aligns in the direction of the applied field. An ensemble of such elements are a major constituent of a micro-optics concentrator.

FIG. 1d is a cross-sectional view of a rotatable element 1 showing an induced dipole micro-mirror 2 which relies solely on the induced polarization dipole field to produce alignment because the electret 5 is not used in this embodiment. The micro-mirror 2 can be either one-sided or preferably two-sided so that the micro-optics concentrator can have either side up, or rotate the micro-mirror 2 a full 360 degrees if desired. The angular orientatons possible are similarly achieved as in FIGS. 1a, 1b, and 1c and so are not shown since these figures can be easily visualized without an electret 5. As shown here in FIG. 4, with V2=V1, V4=V3, V1<V3, and V2<V4, an approximately uniform electric field E is produced perpendicular to the electrodes 5t and 5b as shown. What is shown here in FIG. 4 is the only unstable positon of the mirror 2 perpendicular to the applied field E. From this unstable position the mirror 2 will rotate to an alignment in which the mirror is parallel to any direction of the applied field. An ensemble of such elements are a major constituent of a micro-optics concentrator.

Examples of materials that are appropriate transparent dielectrics for making the elements 1 are: glass, polycarbonate, acrylic polymers made from acrylic derivatives such as acrylic acid, methacrylic acid, ethyl acrylate, methyl acrylate (some trade names are lexan, lucite, plexiglass, etc.). Electrets may be made from teflon, castor wax, carnuba wax, and other materials. A conducting, but highly resistive material like Indium/Tin Oxide (ITO) can be sputtered on the sheets that contain the elements 1 to form the addressing electrodes. The optically transparency of ITO makes it ideally suited for addressing the balls.

Let us now look at various possible embodiments of the instant invention for the addressing electrodes. The different configurations shown, and combinations of them can operate to align the elements 1 and track the sun, or other light source in a non-solar appliaton.

FIG. 2a represents a top view of an array of partitioned highly resistive electrodes with grid spacing L showing in detail a top view of one such electrode 5t and the voltages at its four corners. Voltages V1 and V2 correspond to voltages V1 and V2 shown in the cross sectional FIGS. 1a, 1b, 1c, and 1d. Voltages V1' and V2' are the voltages at the corners of this top electrode 5t below the plane of the paper. Each partitioned electrode is made of a highly resistive thin transparent conductor such as an alloy of indium tin oxide (ITO).

FIG. 2b represents a bottom view of an array of partitioned highly resistive electrodes with grid spacing L showing in detail a view of a bottom electrode 5b and the voltages at its four corners. Voltages V3 and V4 correspond to voltages V3 and V4 shown in the cross sectional FIGS. 1a, 1b, 1c, and 1d. Voltages V3' and V4' are the voltages at the corners of this bottom electrode 5b below the plane of the paper.

FIG. 3a represents a top view of an array of fragmented highly resistive wire electrodes with grid spacing L showing in detail a top view of a set of four such adjacent electrodes and the voltages at their ends. At the top, wire electrode 6t has voltages V1 and V2 at its ends which correspond to voltages V1 and V2 shown in the cross sectional FIGS. 1a, 1b, 1c, and 1d. Wire electrode 6pt is a wire perpendicular to the plane of the paper with voltages V1 and V1' at its ends. Wire electrode 6vt is a vertical wire with respect to the plane of the paper with voltages V2 and V2' at its ends. Wire electrode 6ut has voltages V1' and V2' at its ends, and is under the top electrode 6t. Each fragmented wire electrode is made of a highly resistive thin transparent conductor such as an alloy of indium tin oxide (ITO).

FIG. 3b represents a bottom view of an array of fragmented highly resistive wire electrodes with grid spacing L showing in detail a bottom view of a set of four such adjacent electrodes and the voltages at their ends. At the bottom, wire electrode 6b has voltages V3 and V4 at its ends which correspond to voltages V3 and V4 shown in the cross sectional FIGS. 1a, 1b, 1c, and 1d. Wire electrode 6pb is a wire perpendicular to the plane of the paper with voltages V3 and V3' at its ends. Wire electrode 6vb is a vertical wire with respect to the plane of the paper with voltages V4 and V4' at its ends. Wire electrode 6ub has voltages V4 and V4' at its ends, and is under electrode 6b.

Operational Modes

Let us consider various combinations of the electrodes and their advantages and disadvantages. The partioned electrodes 5t and 5b of FIGS. 2a and 2b may be operated as a pair. The advantage of doing this is that the most approximately uniform electric fields may thus be created here with only a negligible amount of fringing fields at the edges. A disadvantage of this configuration is that it has the smallest optical transparency since the incident light must be transmitted and reflected through each partoned electrode of, for example, transparent ITO.

Operating the fragmented wire electrodes of FIGS. 3a and 3b as a pair has the advantage of providing the greatest transparency since the wire electrodes have a small cross section with most of the light passing between them. Thus a larger percentage of the incident light will be reflected to the receiver. A disadvantage of this configuration is that it produces the least uniform electric fields. Yet because of the symmetry the components of the field that diverge from uniformity cancel, and a main component remains to align the elements (balls and cylinders) in the same direction as would be provided by the corresponding uniform electric field that partioned electrodes would produce. This configuration has the further advantage that when the top side becomes worn or soiled, this configuration can be turned over so the pristine bottom side can be used on top with a high transparency to the incident and reflected light. Both the two-mirror embodiment of FIGS. 1a, 1b, and 1c, and the two-sided single mirror embodiment of FIG. 1d can be operated with either side up, as well as rotating the mirror(s) a full 360 degrees if needed.

The presently preferred configuration is the fragmented wire electrodes of FIG. 3a on top to receive the light, combined with the partioned electrodes of FIG. 2b on the bottom so that the combination more closely approximates the desired uniform electric field. With the fragmented wire electrodes configuration on top, the same large percentage of the incident light will be reflected to the receiver as for the configuration of fragmented wire electrodes on both top and bottom.

FIG. 4 is a cross-sectional view of an ensemble of n micro-mirrored elements 1 bewteen the electrodes of one grid element 40 which is nL, n times longer than the grid length L in the previous FIGS. 1, 2, and 3. A grid length nL requires an approximately n times greater voltage, nV, to produce the same electric field. In order to accomplish this economically, one can use a pulsed voltage source, when the elements 1 need only be aligned intermittently. The elements 1 (balls and cylinders) may be individually oriented, or groups may be collectively aligned to simplify tracking and focussing. When groups are collectively oriented, as a group they may have a projected group concavity to aid in the focussing to the receiver. The number of mirrors per grid cell are a design variable. The voltages can be controlled by a small micro-processor (computer) with analog voltage outputs.

Theres is a trade-off between complexity of the grid, and size of the power supply and control system. One element per grid cell is the maximum complexity of the grid and control system, and presents the minimal requirement for the power supply. Unlike displays that require high resolution, groups of balls may be collectively oriented to simplify tracking and focussing. When groups are collectively oriented as a group they may have a projected group concavity to aid in the focussing to the collector. However alignment of large groups increases the size of the power supply since the applied electric field is proportional to the voltage/grid spacing. In order to affectively align 10,000 elements (balls or cylinders) with a grid spacing 100 times ($100^2$=10,000) that of one element, a voltage, V, 100 times as large is needed as for the alignment of one element. The power is proportional to $V^2$. Such an increase in power would be formidable if a continuous duty power supply were needed. However, only intermittant alignment of the elements is necessary in the tracking of the sun, so a pulsed or step function voltage source may be used. An intermittent use of large voltage is much less difficult to achieve than the same steady state voltage.

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents.

What is claimed is:

1. A micro-optics solar concentrator comprising:
   a) an array of rotatable micro-mirrors
   b) a voltage for producing an induced electric dipole in said rotatable micro-mirrors;
   c) opposingly faced pairs of electrodes in a grid array for coupling to said induced electric dipole;
   d) a micro-processor for selectively addressing a pair of said electrodes; and
   said micro-processor for establishing independent voltages at the corners of said electrodes.

2. The apparatus of claim 1, wherein an electret is placed adjacent to each micro-mirror so that its permanent electric dipole is parallel to said induced electric dipole.

3. The apparatus of claim 1, wherein an electret is sandwiched between pairs of micro-mirrors.

4. The apparatus of claim 1, wherein said pair of electrodes are fragmented wires forming the edges of the top and bottom faces of a rectangular parallelepiped.

5. The apparatus of claim 1, wherein said pair of electrodes are partitioned rectangular top and bottom sides of a rectangular parallelepiped.

6. The apparatus of claim 1, wherein one electrodes forms the partitioned rectangular side of one face of a rectangular parallelepiped that is opposite a fragmented wire electrode forming the side edges of the opposite face.

7. A method of concentrating solar energy provided by an array of rotatable micro-mirrors comprising the steps of:
   a) producing an induced electric dipole in said rotatable micro-mirrors;
   b) producing a grid array of independently orientable electric fields for coupling to the induced electric dipoles;
   c) addressing said grid array; and
   d) aligning said rotatable micro-mirrors by utilizing of said electric fields.

8. The method of claim 7 further comprising the step of placing an electret adjacent to each micro-mirror so that its permanent electric dipole is parallel to said induced electric dipole.

9. The method of claim 7 further comprising the step of sandwiching an electret between pairs of micro-mirrors.

10. The method of claim 7 further comprising the step of producing the electric fields by utilizing pairs of electrodes in the form of fragmented wires forming the edges of the top and bottom faces of a rectangular parallelepiped.

11. The method of claim 7 further comprising the step of producing the electric fields by utilizing pairs of electrodes in the form of are partitioned rectangular top and bottom sides of a rectangular parallelepiped.

12. The method of claim 8 further comprising the step of producing the electric fields by utilizing pairs of electrodes wherein one electrodes forms the partitioned rectangular side of one face of a rectangular parallelepiped that is opposite a fragmented wire electrode forming the side edges of the opposite face.

13. The method of claim 7 further comprising the step of producing the electric fields by utilizing an intermittent voltage source.

14. A focussing and directing concentrator of reflected light comprising:
   a) an array of rotatable micro-mirrors
   b) a voltage for producing an induced electric dipole in said rotatable micro-mirrors;
   c) opposingly faced pairs of electrodes in a grid array for coupling to said induced electric dipole;

d) a micro-processor for selectively addressing a pair of said electrodes; and said micro-processor for establishing independent voltages at the corners of said electrodes.

15. The apparatus of claim 14, wherein an electret is placed adjacent to each micro-mirror so that its permanent electric dipole is parallel to said induced electric dipole.

16. The apparatus of claim 14, wherein an electret is sandwiched between pairs of micro-mirrors.

17. The apparatus of claim 14, wherein said pair of electrodes are fragmented wires forming the edges of the top and bottom faces of a rectangular parallelepiped.

18. The apparatus of claim 14, wherein said pair of electrodes are partitioned rectangular top and bottom sides of a rectangular parallelepiped.

19. The apparatus of claim 14, wherein one electrodes forms the partitioned rectangular side of one face of a rectangular parallelepiped that is opposite a fragmented wire electrode forming the side edges of the opposite face.

20. The apparatus of claim 14, wherein said induced electric dipole is produced by voltage source.

* * * * *